Figure 1:
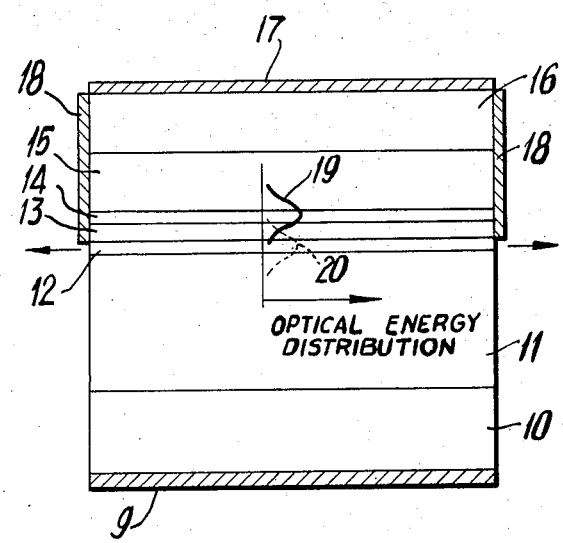

United States Patent
Yonezu

[11] 3,806,830
[45] Apr. 23, 1974

[54] COMPOSITE SEMICONDUCTOR LASER DEVICE

[75] Inventor: Hiroo Yonezu, Tokyo, Japan

[73] Assignee: Nippon Electric Comapny Limited, Tokyo, Japan

[22] Filed: Feb. 9, 1973

[21] Appl. No.: 331,034

[30] Foreign Application Priority Data
Feb. 23, 1972 Japan.................................. 47-19226

[52] U.S. Cl. ....................... 331/94.5 H, 317/235 R
[51] Int. Cl. ............................................. H01s 3/00
[58] Field of Search............. 331/94.5 H; 317/235 R

[56] References Cited
UNITED STATES PATENTS
3,691,476  9/1972  Hayashi ......................... 331/94.5 H
3,733,561  5/1973  Hayashi ......................... 331/94.5 H Primary Examiner—Edward S. Bauer
Attorney, Agent, or Firm—Sandor, Hopgood & Calimafde

[57] ABSTRACT

A composite semiconductor laser device includes a multi-layer heterostructure including first and second double heterostructures. One of the double heterostructures forms a laser structure in which a p-type layer and an n-type layer, each of which has a relatively low index of refraction, sandwich an active region of a relatively high index of refraction. The second double heterostructure, which forms an optical transmission line, includes layers of the same conductivity type. The energy gap of the central layer of the optical transmission line structure is greater than that of the active region. The central layer is crystallographically connected with the low-refractive index layer of the laser structure of the same conductivity type.

9 Claims, 2 Drawing Figures

COMPOSITE SEMICONDUCTOR LASER DEVICE

The present invention relates generally to semiconductor lasers, and more particularly to a composite-type semiconductor laser device.

In recent years, semiconductor lasers capable of continuous oscillation at room temperature have been developed to the stage of practical use. Present efforts in the development of semiconductor lasers are primarily directed at achieving easier oscillation and longer useful life of the laser. One semiconductor laser device capable of continuous oscillation operation at room-temperature, that is, one having relatively low threshold current density, is the so-called double heterostructure laser, in which a thin GaAs layer serving as an active region is crystallographically interposed between a p-type $Ga_xAl_{1-x}As$ layer and an n-type $Ga_xAl_{1-x}As$ layer. The threshold current density for the pulsed excitation of this laser at room temperature is approximately 1,000A/cm² in favorable conditions, whereas that for DC excitation at room temperature is as high as around 1,500 A/cm² because of an increase in temperature.

When a laser device of this type is brought into oscillation by causing a direct current of 1,500 A/cm² to flow therethrough, a degradation phenomenon is observed in which the oscillation output is gradually reduced and oscillation is eventually completely terminated within several hours to several tens of hours. The rate of degradation in the oscillation output is approximately proportional to the square of the current density at the laser active region.

In addition to its effect in increasing the ease of producing oscillation, the lowering of the threshold current density is a matter of concern to those engaged in the development of semiconductor laser devices. Since the prior art laser device described above uses the cleavage plane of a crystal as reflecting surfaces to constitute a resonator, the reflection factor may be as low as 30 percent. Therefore, 80 percent of the total loss of the semiconductor laser can be attributed to the reflection loss at the reflecting surfaces. If a reflection film is formed such as by evaporation to raise the reflection factor to 100 percent, the threshold current density can be lowered by as much as one-third, thereby realizing a reduced threshold value of about 300 A/cm², thereby to lengthen the useful life of the laser device. However, if the reflection ratio is raised to 100 percent, an optical output at a practical level will not be produced, even though the conventional semiconductor laser devices are capable of producing outputs of several milliwatts to several tens of milliwatts. In other words, the lowering of the threshold current density level results in a marked decrease in the output level, which renders the laser device impractical.

It is an object of the present invention to provide a semiconductor laser device which has a lowered threshold current density and a reduced reflection loss without lowering the laser output level.

The semiconductor device of the present invention includes two double heterostructures each of which is constructed such that a layer of a relatively high refractive index is sandwiched between layers of relatively low refractive index within an identical crystal body. One of the double heterostructures forms what may be designated a double heterostructure laser or laser oscillator portion in which a p-type and an n-type layer, having a relatively low refractive index, sandwich an active region having a relatively high refractive index. The other double heterostructure forms an optical transmission line in which all the layers are of an identical conductivity type and in which the energy gap of the central sandwiched layer is higher than that of the active region. That central layer is crystallographically connected with the same conductivity type one of the lower refractive index layers of the double heterostructure laser, the thicknesses of the respective layers being so controlled that light waves propagating within the two double heterostructures may permeate so as to be electromagnetically coupled with each other.

As will be seen, the semiconductor laser of the present invention has two separate light paths, one forming the optical cavity for the laser oscillation and the other taking out the laser oscillation output from the interior of the optical cavity based on the electromagnetic coupling with the former. This structure permits the threshold current density level to be lowered with the laser output being maintained at a high level. The threshold current density of the double heterostructure laser can be lowered to about 1,000 A/cm² by reducing the thickness of the active region.

When the active region is thick, the light waves are mostly confined within the active region. In contrast, when the active region is thin, the light waves permeate out of the active region. The amount of the overpermeation, which depends on the thickness of the active region and the difference in the refractive index between the active region and the regions between which the active region is arranged, becomes large when the difference in the refractive index is small. On the other hand, when the refractive index difference is small, the effect of the double heterostructure laser is reduced, and the threshold current density cannot be sufficiently lowered.

In general, in a double heterostructure laser in which the active region is formed of GaAs and the regions having the active region interposed therebetween are formed of $Ga_{0.7}Al_{0.3}As$, the light waves are sufficiently confined within the active region even when the thickness of the active region is decreased to approximately the wavelength of the laser oscillation, although the light waves will permeate out of the active region when the thickness of the active region is less than the oscillation wavelength. If an optical transmission line is provided that is so close to the active region that the overpermeating light rays may be coupled thereto, the latter rays will propagate through the output light path.

The output light path or, in other words, the optical transmission path portion, can be formed by a double heterostructure, in which the refractive index of the central layer is made larger than that of the surrounding regions. The energy distribution of the propagating light, of course, varies depending on the difference in the refractive index and the thickness of the central layer, and the state is substantially the same as in the case of the double heterostructure laser. However, in order to prevent the central layer from absorbing the light from the double heterostructure laser, the central layer of the light transmission line portion should be made of a material having a band gap that is larger than that of the active region of the double heterostructure laser.

This requirement may be met, as in the embodiment of the invention that is herein specifically described, by a structure in which $Ga_{0.9}Al_{0.1}As$ is held between $Ga_{0.7}Al_{0.3}As$. In view of power consumption and heat dissipation, the loss incurred in the optical transmission line should be as low as possible. The optical transmission line portion should have regions of either n-type or p-type, and be crystallographically connected with the double heterostructure laser portion through the region of the same conductivity type. The double heterostructure laser portion should be located in the vicinity of the surface of the laser device. In this structure, the reflection factor of the reflectors in the double heterostructure laser portion may be 100 percent, or a ring laser may be constituted. The threshold current density can thus be reduced to approximately one-third as compared with that for the usual case of 30 percent reflection, to facilitate the continuous oscillation and to lengthen the useful life of the laser device by a factor of 10 or more. Since the laser output can be taken out from the optical transmission line portion coupled with the optical cavity portion, a sufficient output level is obtained.

Figure 2:
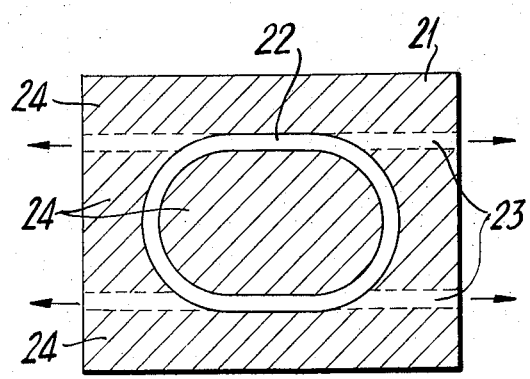

The present invention will now be described with reference to the accompanying drawings in which:

FIG. 1 is a schematic cross-sectional view of a composite semiconductor laser according to one embodiment of the invention, and FIG. 2 illustrates the surface electrode structure of a semiconductor device according to a second embodiment of the invention.

FIG. 1 illustrates an embodiment of the present invention manufactured by a continuous liquid epitaxial growth process. As therein shown, a multilayer structure is formed on an n-type GaAs substrate 10. The multilayer structure includes the following layers which are formed sequentially in the order mentioned: a 3 micron thick n-type $Ga_{0.7}Al_{0.3}As$ layer 11, a 0.2 micron thick n-type $Ga_{0.9}Al_{0.1}As$ layer 12, a 0.3 micron thick n-type $Ga_{0.7}Al_{0.3}As$ layer 13, 0.2 micron thick p-type GaAs layer 14, a 1 micron thick p-type $Ga_{0.7}Al_{0.3}As$ layer 15, and a 10 micron thick p-type GaAs layer 16, by lowering the temperature at a rate of 0.5°C/min. from 850°C. The last p-type GaAs layer 16 is formed in order to provide a good ohmic contact 17 at the surface, and is not critical for the principle of the present invention.

A double heterostructure portion is formed of the n-type $Ga_{0.7}Al_{0.3}As$ layer 13, the p-type GaAs layer 14 serving as an active region, and the p-type $Ga_{0.7}Al_{0.3}As$ layer 15. An optical transmission line portion is formed of the n-type $Ga_{0.7}Al_{0.3}As$ layer 11, the n-type $Ga_{0.9}Al_{0.1}As$ layer 12, and the n-type $Ga_{0.7}Al_{0.3}As$ layer 13. Reflection films 18 having a reflection factor of about 100 percent are provided on the cleavage planes of the crystal so as to extend over from the n-type $Ga_{0.7}Al_{0.3}As$ layer 13 to the p-type GaAs surface layer 16 with the center at the active region 14. A Fabry-Pérot type reasonator is thus constituted. The reflection film 18 is formed in such a way that an $SiO_2$ film provided by evaporation has gold or a dielectric evaporated thereon into a multilayer film. Hatched parts 9 and 17 are ohmic electrodes for electrical connection.

Layer 13, active region layer 14, and layer 15 form a double heterostructure laser structure or laser oscillation portion, in which the indices of refraction of layers 13 and 15 are relatively low as compared to the index of refraction of the active region 14 sandwiched therebetween. Layer 11, central layer 12, and layer 13, all of which are of the same conductivity type, form a double heterostructure optical transmission line portion. It will be noted that layer 13 is common to both the laser portion and optical transmission line portion.

The enegy gap of central layer 12 is higher than that of the active region 14, and the index of refraction of central layer 12 is greater than that of layers 11 and 13 between which layer 12 is sandwiched. In addition, central layer 12 of the optical transmission line structure is crystallographically connected with the lower refractive index layer 13 of the double heterostructure laser portion.

In this embodiment, standing waves developed in the active region 14 of the laser oscillation portion have an energy distribution as indicated by the distribution curve 19 in which approximately 50 percent of the energy lies outside the active region 14 in the surrounding layers 13 and 15. On the other hand, light waves propagating around the central layer 12 of the optical transmission line portion have an energy distribution as indicated by the distribution curve 20 in which approximately 60 percent of the energy permeates out of the central layer 12 into layers 11 and 13. Both light waves are coupled with each other through the n-type $Ga_{0.7}Al_{0.3}As$ layer 13 in the sense of the electromagnetic wave theory, since the layer 13 constitutes an element of both the laser oscillation portion and the optical transmission line portion.

Accordingly, approximately 20 percent of the energy of the light waves produced by laser oscillation in the active region 14 propagates centering around the central layer 12 of the optical transmission line portion, and goes out through the surfaces at both ends of the crystal.

When a non-reflecting film is provided on the end surfaces of the crystal, the output light can be derived more efficiently. The threshold current density of pulsed oscillation for operation without the reflection films 18 is approximately 1,000 A/cm². In contrast, when the reflection films 18 are formed, the threshold current density becomes approximately 300 A/cm². When the laser device is forward biased with the ohmic electrode 17 attached to a heat sink electrode (not shown) which may be made of diamond or copper, and with an ohmic electrode 9 provided on the side of the substrate 10, the room-temperature DC oscillation is made possible at a threshold current density of approximately 450 A/cm². The useful life of the device of the invention is sufficiently long as compared with that of the prior art devices.

The coupling between the laser oscillation portion and the optical transmission line portion can be intensified in such a way that the thickness of the n-type $Ga_{0.7}Al_{0.3}As$ layer 13 located therebetween is made small, that the active region 14, and the central layer 12 of the optical transmission line portion are made thin, or that the differences of the refractive indices of the laser oscillation portion and the optical transmission line portion are made asymmetric. The n-$Ga_{0.7}Al_{0.3}As$ layer 13 may be replaced with, for example, one of n-$Ga_{0.8}Al_{0.2}As$, so as to give unevenness to the light wave energy distributions of the laser oscillation portion and the optical transmission line portion to the boundary layer 13. In this manner, the composition and the thickness of each layer are not restricted to those specifically described in the above embodiment. In addition, the materials are not restricted to those specifically described in this embodiment. The effect of the present invention is achieved if the laser oscillation portion and the optical transmission line portion are arranged in the form of crystal layers and are coupled in the sense of electromagnetic wave theory. Needless to say, the conductivity types of the p- and n-type layers may be the opposite of those in the embodiment of FIG. 1.

In the embodiment of the present invention illustrated in FIG. 2, which has a layer structure similar to that of FIG. 1, an electrode 22 is formed, which is 1 mm in radius at each curved part, 2 mm in spacing between rectilinear parts, and 10 microns in width. Electrode 22 is in the form of a ring formed at a selected area in an SiO$_2$ insulating film 21 on the surface of the structure. When current is caused to flow, only the active region under the ring-shaped electrode 22 is excited. In consequence, the refractive index of that region is increased and the light propagates only through that region. The device is called a ring laser, and has no reflection loss.

In order to establish directivities that are dependent on the optical transmission line, a region 24, other than the desired optical transmission lines 23, is changed to an absorbent layer by irradiating it with protons from the surface down to a depth exceeding the central layer 12 of the optical transmission line, and the light waves are coupled in the sense of the electromagnetic wave theory as has been explained in conjunction with FIG. 1. The laser output can be conducted into a desired shape with parts of the active region and parts of the optical transmission lines 23, both of which underlie the ring-shaped electrode 22. In this construction, the layer consuming electric power (the active region) is not exposed to the surface, so that the useful life of the device is prolonged. Since the configuration of the laser oscillation portion and that of the optical transmission line portion can be arbitrarily made, a complicated optical integrated circuit can be formed by combining a plurality of the structure shown in FIG. 2.

Thus, although the invention has been herein specifically described with respect to several embodiments thereof, it will be apparent that modifications may be made therein without departure from the spirit and scope of the invention.

What is claimed is:

1. A composite semiconductor laser device comprising a semiconductor substrate and a multilayer heterostructure including first and second double heterostructures formed on said substrate, said first double heterostructure forming a double heterostructure laser structure in which a p-type layer and an n-type layer, each of which has a relative low refractive index, sandwich an active region of a relatively high refractive index layer therebetween, said second double heterostructure forming an optical transmission line structure in which all the layers are of an identical conductivity type, the energy gap of the central layer of said second double heterostructure being greater than that of said active region, said central layer being crystallographically connected with one of the low-refractive index layers of the same conductivity type, the thicknesses of the respective layers being so controlled such that light waves propagating within said double heterostructures permeate out of said central layer of said second double heterostructure.

2. The composite semiconductor laser device of claim 1, in which said active region is of the same conductivity type as the layers in said optical transmission line double heterostructure.

3. The composite semiconductor laser device of claim 2, in which said one of said low-refractive index layers is common to said first and second double heterostructures.

4. The composite semiconductor laser device of claim 3, in which the index of refraction of said central layer is greater than that of the layers of said second double heterostructure between which said central layer is sandwiched.

5. The composite semiconductor laser device of claim 1, in which said one of said low-refractive index layers is common to said first and second double heterostructures.

6. The composite semiconductor laser device of claim 5, in which the index of refraction of said central layer is greater than that of the layers of said second double heterostructure between which said central layer is sandwiched.

7. The composite semiconductor laser device of claim 1, in which the index of refraction of said central layer is greater than that of the layers of said second double heterostructure between which said central layer is sandwiched.

8. The composite semiconductor laser device of claim 1, further comprising an insulating film on the surface of said multilayer heterostructure, and an electrode of a preselected configuration formed on said insulating film for defining, when current is passed therethrough, the active region of said laser portion.

9. The composite semiconductor laser device of claim 8, further comprising a light absorbent region formed in said optical transmission line portion at areas other than the desired optical transmission lines.

* * * * *